United States Patent Office 3,832,233
Patented Aug. 27, 1974

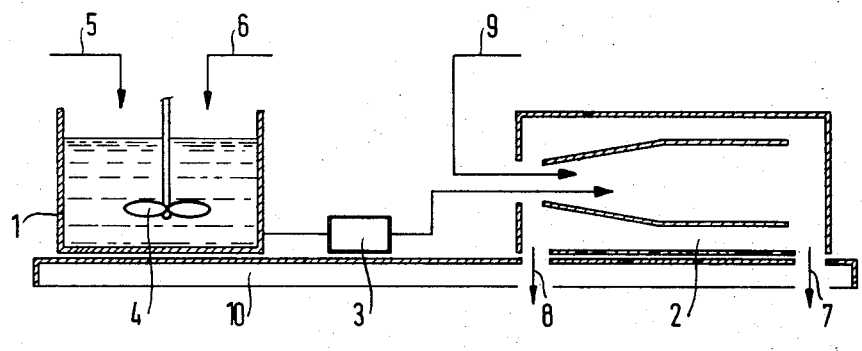

3,832,233
METHOD FOR REMOVING THE FAT FROM FAT-CONTAINING RAW MATERIALS
Hartwig E. Fritze, Ravensburg, Germany, assignor to Escher Wyss GmbH, Ravensburg, Germany
Filed Mar. 3, 1972, Ser. No. 231,535
Int. Cl. C11b 1/10; C13l 1/02
U.S. Cl. 127—68                                      8 Claims

ABSTRACT OF THE DISCLOSURE

Process for de-fatting fat-containing, dryly degerminated seed material, such as corn grits, which involves soaking a ground fraction of the seed material with a fat solvent and separating the solvent from the de-fatted seed material. The process is especially applicable to obtaining starch from corn grits.

---

The present invention relates to a method of removing fat from fat-containing raw materials that have been finely ground in a mill or the like and dryly degerminated. The method is particularly incorporated in the manufacturing process of starch from corn grits.

In the conventional manufacture of starch from corn or similar materials it is customary to first swell or soak a batch of whole kernels. For this a washing system of a plurality of tanks is used and a swelling liquid or fluid, to which an acid such as sulphur dioxide dissolved in water is in general added, is recirculated between the tanks. Pre-heated water is used in general as the swelling liquid or fluid. Pre-heating of the liquid is effected whenever the liquid is pumped from one tank to another to thereby accelerate the soaking process of the corn kernels and to facilitate at the same time the separation of the fatty germ which takes place at a later stage. The swelling process takes place in general at temperatures of about 60° C. over about 55 to 60 hours. The acid added to the swelling liquid serves the purpose of enhancing the solvent action of water with respect to those components of the corn kernel that are undesirable in the subsequent manufacturing process of pure starch. Such undesirable components of the corn kernel are for example proteins and mineral substances. These undesirable components are therefore washed off within this primary step of swelling or soaking of the whole corn kernels.

After the termination of the above primary step the resultant "softly" soaked material is drained, i.e. the water contained in the material is removed. The material is then ground in a mill preferably in two steps during which fresh water may be supplied. The grinding process serves the purpose of removing the fatty germ in a piece from each corn kernel. The thusly separated germs are then washed, pressed and dried whereas the remaining fraction is finely ground, then washed by use of a water jet apparatus, then screened and finally refined.

With regard to the removal of the fatty germ from corn kernels it is customary to make use of a so-called dry degermination process. In this particular process the whole corn kernels are first dryly ground and then screened and wind sifted to separate the germs from the corn kernels. The grinding or ground stock also known as corn grit is classified in four fractions a coarse fraction which is used for example in the manufacture of cornflakes, a middle or medium fraction which may also result from a repeated grinding of the coarse fraction and which is used in the manufacture of beer in place of the normally used malt a fine fraction and a finest fraction. It is well understood by one skilled in the art that this dry degermination of corn kernels is generally made use of in the manufacturing process of beer. The fine fraction and the finest fraction are somewhat powdery having a grain size of about 50 to 500 microns and which are obtained in a quantity of about 20 percent and may be used for example as flour or as a feeding-stuff. This particular use of these two latter fractions is limited, however, since they have a fat content of about 3 to 8 percent owing to the fact that by this dry degermination contrary to the before-mentioned wet degermination, the germs are not fully removed from the corn kernels.

It is accordingly an object of the present invention to provide a method that allows the removal of the fat from fat containing raw materials that are present in a finely ground state is different fractions with grain sizes of about 50 to 500 microns or less.

It is a further object of this invention to provide a method of removing the fat from the corn grits that are obtained by a dry degermination from whole corn kernels whereby the fine fraction and the finest fraction are to be considered as the critical grain sizes with respect to their fat content.

It is still a further object of the present invention to provide a method of removing the fat from corn grits to such an amount that pure starch may be manufactured from the resulting product being substantially free of any fat.

In accordance with these objects it is suggested by the present invention to first swell or soak a thusly defined raw material with a liquid or fluid and then remove the fluid from the material through a gravity separation and/or a centrifugal force separation to thereby remove at the same time the fat contents of the material. Although this measure may obviously be effected in quite a simple manner it surprisingly results in a high efficiency. It has been found in practice that the fat content may be reduced to one-eighth times the original value.

This high efficiency of the inventive method is especially achieved when during the swelling operation the raw material and liquid is intensively stirred. The stirring also results in a reduction of the swelling time. The swelling should be carried-out over about 8 to 25 hours and experiments have shown that corn grits having a starting fat content of about 8 percent could be treated with the aimed high efficiency when soaked over a period of about 15 hours. The efficiency also can be improved by preheating the swelling liquid and adding an acid, such as sulphur dioxide dissolved in water, to the swelling liquid.

The method of this invention may be carried-out by using a tank provided preferably with a stirrer or an agitator and in which tank the swelling process is carried-out. To this tank is connected via a pump a suitable separation device for separating the liquid and the solid matters. A decanter is preferably used as the separating device because thereby the aimed high efficiency has been proven as being optimal. As known in the art such decanters allow the separation of liquid and solid materials by gravity. Instead of a decanter a machine may be used which operates on a centrifugal force principle, for example hydrocyclones. To enable a continuous charging of the separation device, a second swelling tank may be provided. The second tank also preferably is provided with a stirrer or agitator and the two tanks are alternatively connected to the separation device.

The present method allows a further treatment of material that hitherto was thrown away as a useless by-product in the dry degermination process of corn kernels or used to an extent of no economical importance. The dry degermination of corn kernals therefore becomes more economical especially in view of the fact the resulting product, having an average fat contents of only about 1 percent, may be used for manufacturing starch. It should be noted in this connection that the resulting material must be finally ground for this purpose followed by the same method steps that were explained above by reference to the described wet degermination process which so far has been used almost exclusively for manufacturing pure starch. The finely ground material therefore must then be washed, screened and finally refined. Experiments have proven that the incorporation of the present method in a manufacturing process of starch results in a starch of such a quality that corresponds especially in its fat contents with starch manufactured by the previously known wet degermination process. The protein content is in general lower.

The material obtained by the present method also may be used in manufacturing processes of foodstuffs and feeding-stuffs. The present method is not restricted to corn grits but may rather be applied to any raw material having a relatively high content of fat and being present in a finely ground state. In view of its preferred incorporation in a manufacturing process of starch the present method therefore may especially be applied to all of those materials which are also used conventionally for the manufacture of starch.

In the drawing an apparatus is schematically shown that allows putting into effect the present method. Referring to the drawing a swelling tank 1 is shown connected via a pump 3 to a decanter 2. All three units are arranged on a base plate 10. The tank 1 is provided with a stirrer 4. The raw material that is obtained in a fine fraction and in a finest fraction from a dry degermination process is supplied to the tank 1 as indicated by the arrow 5. This raw material is intensively swollen or soaked in the tank 1 in the presence of a suitable liquid such as water in general that is supplied via a conduit 6. It should be understood that this liquid is preferably preheated to a temperature of about 50 to 60° C. The liquid may also contain a suitable acid such as sulphur dioxide dissolved in water. During this swelling operation the stirrer 4 is actuated. The swelling process should take place over about 8 to 25 hours, i.e. over an average period of about 15 hours. Naturally this swelling time depends upon several factors and especially upon the nature of the raw material being treated. When the swelling process is finished the pump 3 pumps the material from the tank 1 in a continuous manner to the decanter 2. The semisolids are separated by gravity and/or centrifugal force from the liquid in the decanter. The swelling liquid, having the fat content of the material therein and also further components that became dissolved in the swelling liquid during the swelling process, such as proteins and mineral substances, flows in a continuous manner in the direction of the arrow 7 from the decanter while the semi-solid materials is continuously discharged therefrom in the direction of arrow 8. This material is subsequently finely ground, then washed, then screened and finally refined, whereby pure starch is obtained. The decanter 2 may be continuously fed via a conduit 9 with fresh liquid such as fresh water containing a suitable acid. There is preferably provided a second tank that may be alternatively connected to the decanter 2 so that the continuous charge of the same is guaranteed.

EXAMPLE

Dryly degerminated corn grits having a fat content of 4 percent dry substance and a grain size of less than 500 microns were soaked in a tank with water containing sulphur dioxide. The tank was provided with a stirrer. The mixture of the bath contents was chosen such that one cubic meter of water containing 0.2 percent by weight sulphur dioxide was used for every ton of corn grits. The swelling process was carried out over 16 hours at a temperature of 50° C. under a continuous agitation of the mixture.

The swollen or soaked corn grits were then pumped to a decanter which separated the suspension into a slop or slurry of corn grits of 40 percent dry substance and a fat content of 1.0 percent dry substance and into swelling or soaking liquid which contained the extracted fat, proteins and mineral substances but which contained no corn grits and also no starch particles.

The fat extraction was repeated by supplying this slop or slurry of corn grits to a further decanter in which the slop was again washed with water containing sulphur dioxide. An amount of 1 cubic meter of water for each ton of corn grits used for the repeated washing. For obtaining a constant optimal suspension concentration of about 7° Bé. a small portion of the swelling water was discharged from a second decanter to the tank.

The resulting corn grits were then further processed by first finely grinding the corn grits and then separating the starch by means of water jet devices from the resulting fine fibers and by means of separators from the resulting gluten. The starch was removed from the starch water and dried to the customary humidity of 12 percent. The quality of starch obtained corresponded with the quality of the starch as manufactured in accordance with the conventional methods.

What I claim is:

1. A method for removing the fat from fat-containing, dryly degerminated seed material obtained from a prior grinding operation as differently sized fractions comprising soaking, over a time period of about 8 to 25 hours, the fraction having a particle size of up to 500 microns with a fat-dissolving liquid having a temperature of about 50 to 60° C. and then removing the liquid from the thusly soaked fraction to thereby remove at the same time the fat content and other substances dissolved in the liquid during soaking.

2. A method according to claim 1, characterized in that said final separation of the liquid is carried out while fresh liquid is continuously supplied.

3. A method according to claim 1, including the step of adding an acid dissolved in water to the soaking liquid.

4. A method according to claim 1 including the further steps of finely grinding the substantially solid material as obtained by said separation, washing the resulting finely ground material and screening and refining the same for obtaining starch.

5. A method according to claim 1, characterized in that the liquid is removed from the soaked fraction by a decanter.

6. A method according to claim 1, characterized in that said liquid is removed from the soaked fraction by a hydrocyclone.

7. A method according to claim 1, including the step of intensively stirring the fraction material during soaking thereof.

8. A method according to claim 1 including the step of maintaining the density of the fraction being soaked at about 7° Bé. during soaking thereof.

References Cited
UNITED STATES PATENTS

| 3,597,274 | 8/1971 | Gillenwater | 127—68 |
| 3,251,717 | 5/1966 | Honeychurch | 127—68 |
| 3,451,990 | 6/1969 | Sole | 260—412.2 X |
| 3,587,696 | 6/1971 | Fairchild | 260—412.2 X |

MORRIS O. WOLK, Primary Examiner

S. MARANTZ, Assistant Examiner

U.S. Cl. X.R.

23—267 MS, 312 A; 127—67; 260—412.2, 412.4